(12) United States Patent
Williams

(10) Patent No.: US 9,727,768 B2
(45) Date of Patent: Aug. 8, 2017

(54) EXECUTABLE MACHINE READABLE SYMBOLOGY

(75) Inventor: Timothy Williams, Northport, NY (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 12/900,032

(22) Filed: Oct. 7, 2010

(65) Prior Publication Data

US 2012/0085818 A1    Apr. 12, 2012

(51) Int. Cl.
*G06F 17/00* (2006.01)
*G06K 7/10* (2006.01)

(52) U.S. Cl.
CPC ....... *G06K 7/10881* (2013.01); *G06K 7/1093* (2013.01); *G06K 7/10851* (2013.01)

(58) Field of Classification Search
USPC ................................................. 235/462, 472
See application file for complete search history.

(56) References Cited

U.S. PATENT DOCUMENTS

| | | | |
|---|---|---|---|
| 5,900,613 A | 5/1999 | Koziol et al. | |
| 5,929,418 A | 7/1999 | Ehrhart et al. | |
| 5,992,752 A | 11/1999 | Wilz, Sr. et al. | |
| 6,464,139 B1* | 10/2002 | Wilz et al. | 235/462.01 |
| 6,764,011 B2 | 7/2004 | Entani | |
| 6,959,871 B1 | 11/2005 | Herrod et al. | |
| 7,077,321 B2 | 7/2006 | Longacre, Jr. et al. | |
| 7,080,786 B2* | 7/2006 | Longacre, Jr. | G06K 7/10544 235/375 |
| 7,104,456 B2 | 9/2006 | Parker et al. | |
| 7,185,817 B2 | 3/2007 | Zhu et al. | |
| 2001/0043273 A1* | 11/2001 | Herrod | G06F 1/1626 348/220.1 |
| 2002/0169817 A1* | 11/2002 | Eves et al. | 709/201 |
| 2006/0196950 A1* | 9/2006 | Kiliccote | 235/494 |
| 2007/0083535 A1* | 4/2007 | Zilliacus et al. | 707/101 |
| 2008/0203167 A1 | 8/2008 | Soule et al. | |
| 2008/0308638 A1* | 12/2008 | Hussey | 235/462.11 |

FOREIGN PATENT DOCUMENTS

CN    1934483 A    3/2007

OTHER PUBLICATIONS https://www.cs.ualberta.ca/resources-services/teaching-resources/java; 2014.*
European Search Report, Application No. 11183740.7, dated Feb. 5, 2015, 3 pages.
European Written Opinion, Application No. 11183740.7, dated Feb. 18, 2015, 9 pages.
Office Action in counterpart Chinese Application No. 201110383124.9 dated Oct. 20, 2015, pp. 1-7.
English-translation of Office Action in counterpart Chinese Application No. 201110383124.9 dated Oct. 20, 2015, pp- 1-7.
Office Action in counterpart Chinese Application No. 201110383124.9 dated Nov. 24, 2016, pp. 1-3.
English-translation of Office Action in counterpart Chinese Application No. 201110383124.9 dated Nov. 24, 2016, pp. 1-6.

* cited by examiner

*Primary Examiner* — Michael G Lee
*Assistant Examiner* — Tabitha Chedekel
(74) *Attorney, Agent, or Firm* — Additon, Higgins & Pendleton, P.A.

(57) ABSTRACT

A method of operating an indicia reader includes reading at least one indicia, the indicia having an encoded executable software program; storing the encoded executable software program into memory of the indicia reader; and running the encoded executable software program.

15 Claims, 3 Drawing Sheets

EXECUTABLE MACHINE READABLE SYMBOLOGY

FIELD OF THE INVENTION

The present invention relates to machine readable symbology, and more particularly to a machine readable symbology with encoded executable software.

BACKGROUND

Indicia reading devices (also referred to as scanners, laser scanners, image readers, indicia readers, etc.) typically read data represented by printed or displayed information bearing indicia (IBI), (also referred to as symbols, symbology, barcodes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Figure 1:
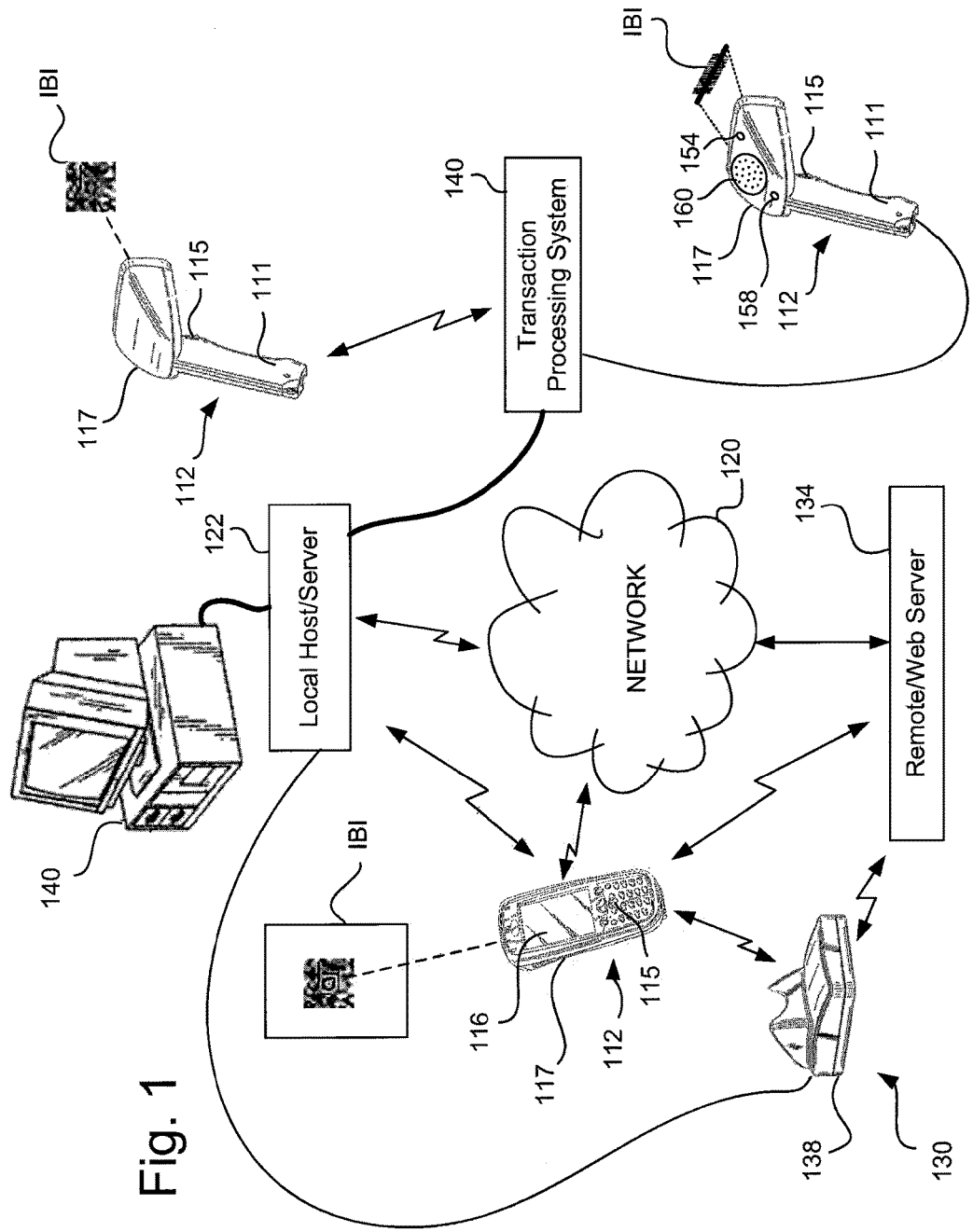
FIG. 1 is a block diagram of an exemplary indicia reader system.

FIG. 1 illustrates an exemplary scanning system configuration, wherein a plurality of indicia readers 112 are operated and utilized where information bearing indicia (IBI) are present. The indicia readers may be stationary or hand-held and may be either laser indicia reading devices (or laser scanners) utilizing transmitted laser light or optical imaging indicia reading devices, also known as optical imaging devices or optical indicia reading devices, utilizing image capturing devices for extracting data from IBIs.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. An IBI or dataform may be an originally machine generated symbology that is also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. An exemplary indicia reader may have a display 116. An exemplary indicia reader 112 may have a number of subsystems provided within a housing 117 configured to be hand held. For example, the reader may have a handle portion 111.

Exemplary indicia readers may be in communication (wired or wireless) to a local transaction processing system 140, such as a cash register, customer station or employee station or local host/server 122 directly or through a charging station or base 138. An exemplary local server 122 or indicia reader 112 may be in communication with network 120 and or a remote/web server 134.

Figure 2:
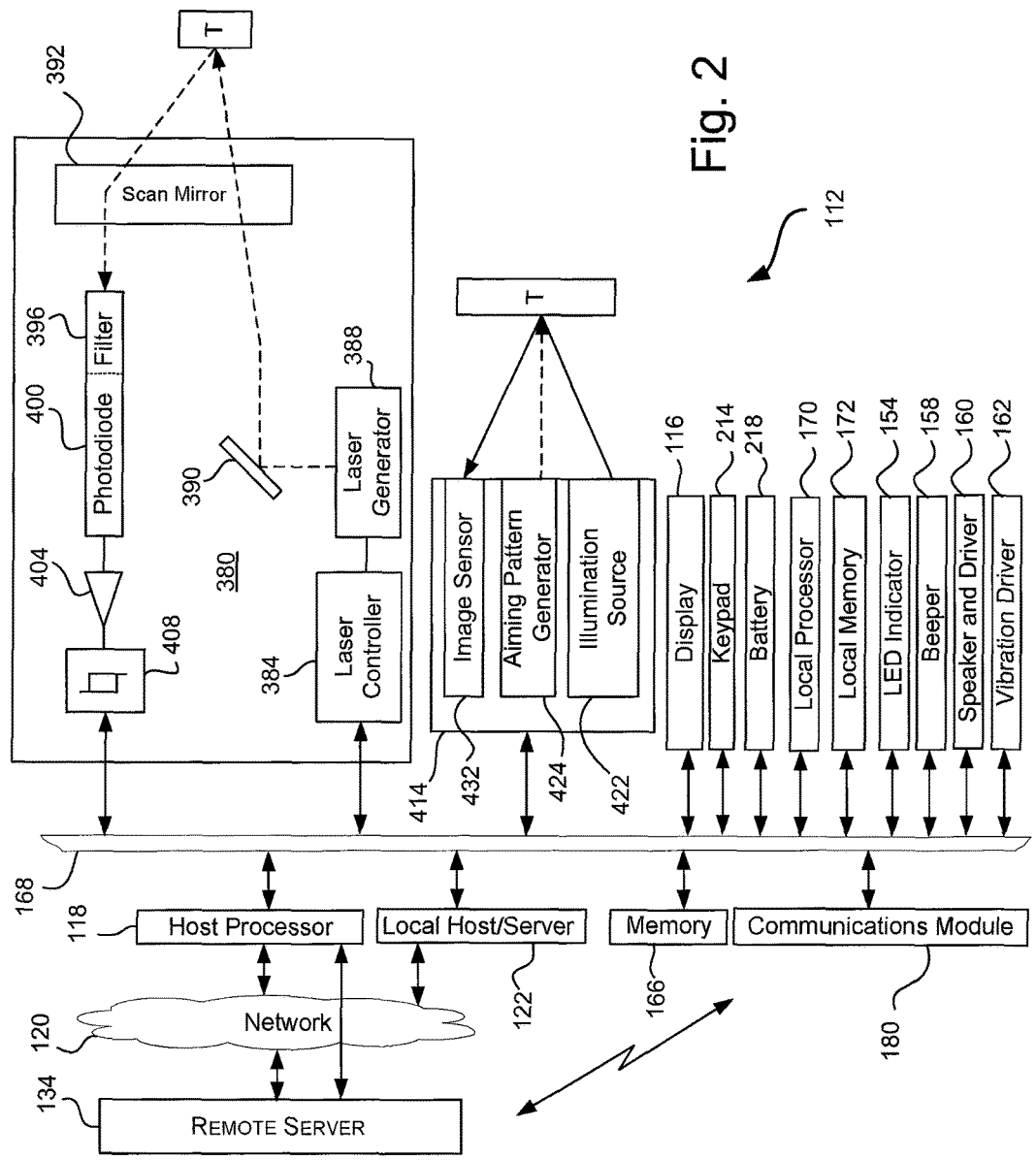
FIG. 2 is a simplified schematic block diagram of an exemplary indicia reader.

Referring to FIG. 2, an exemplary indicia reader 112 may comprise a number of exemplary subsystems, such as a laser scan engine 380 (or laser scanning reader system) for reading indicia on a target T. The laser scanning reader system may comprise a laser controller 384 for controlling a near laser generator 388 for generating a near laser beam which is directed onto a folding mirror 390 which then directs the beam to an oscillating or rotating scan mirror 392 and then onto a target T. The near laser scanning pattern is reflected off of the target and redirected by scan mirror 392 into a receive path comprising a laser light pass filter 396, a photodiode 400, an amplifier 304 and a digitizer 408.

Laser light may be described as a spatially coherent, narrow low-divergence beam of light.

Digitizer 408 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light reflected back to the reader is modulated in brightness by the IBI and the photodiode receive circuit is optimized to detect signals with the modulated patterns.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream.

The output signal of the photodetector may be processed utilizing one or more functions or algorithms to condition the signal appropriately for use in further processing downstream, including decoding of IBIs.

An exemplary indicia reader 112 my comprise a number of exemplary subsystems, such as one or more optical image engines (image indicia reader systems or image readers or image scan engines) 610 for reading indicia on a target T. Image engines capture and read images to detect and decode IBIs located within the captured images. The image indicia reader systems may comprise one or more illumination source(s) 618 for illuminating an IBI with a beam or pattern of incoherent light in the form of an illumination pattern and an image sensor 626 for converting light reflected off a target T having an IBI provided thereon into representative output signals thereof. The output signal of the image sensor may be processed utilizing one or more functions or algorithms to condition the signal appropriately for use in further processing downstream, including decoding of IBIs.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The imager may be either a progressive or interleaved imager. The image sensor may contain an array of light sensitive photodiodes (or pixels) that convert incident light energy into electric charge. Many solid state image sensors also allow regions of a full frame of image data to be addressed.

An exemplary image sensor may use a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning. Exemplary monocolor image sensors are described in U.S. Patent Publication Number 20060274171 entitled DIGITAL PICTURE TAKING OPTICAL READER HAVING HYBRID MONOCHROME AND COLOR IMAGE SENSOR ARRAY the entirety of which is hereby incorporated herein by reference.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more host processor(s) 118, a local host/server 122, local memory 166, network 120 or remote server host/server 134.

Communications module 180 may provide a communication link from imaging reader 112 to other indicia readers or to other systems such as a server/remote processor 134.

The processor(s) may be located on board or within the housing with other subsystems. The particulars of the functionality of the processor(s) and the reader may be determined by or based upon certain configuration settings or data which may be stored in firmware, remote or local memory.

An exemplary processor may be a mixed-signal array with on-chip controller devices designed to replace multiple traditional MCU-based system components with one single-chip programmable device. It may include configurable blocks of analog and digital logic, as well as programmable interconnects.

The reader subsystems in the reader may be connected by one or more bus 168, data lines or other signal or data communication form. Exemplary forms may be an Inter-IC bus such as a two wire interface (TWI), dedicated data bus, RS232 interface, USB, etc.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon certain configuration settings stored in firmware or memory which may be any one of a number of memory types such as RAM, ROM, EEPROM, etc. In addition some memory functions may be stored in memory provided as part of the processor(s).

Exemplary functions of the processor(s) may be controlling operation of the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code contained in the photodetector output signal.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding operating relationships or modes which the reader will use. Two exemplary operating modes may be continuous or discontinuous. In the continuous operating mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous operating mode, the reader takes continuous scans one after another (seriatim) and continuously decodes or attempts to decode some or all scanned targets. Discontinuous operating mode is a mode wherein scanning and/or decoding is initiated with an actuation event, such as pulling of a pull trigger 115, or the receipt of an electronic enabling signal and scanning and/or decoding is terminated with a timeout, or a successful read. An exemplary utilization of the reader in discontinuous operating mode is via hand held operation. Decoding stops once the indicia reader is no longer triggered the reader has timed out or a successful read is made. The discontinuous operating mode is typically initiated because the operator knows a symbol is present.

Exemplary indicia readers may use memory or firmware to store certain reader settings or reader configuration settings. Exemplary configuration settings may be selection of scanning distance, trigger mode functionality, pre-defined bar code output data based on the scan input, continuous scanning operating mode, discontinuous scanning operating mode or routine, decoding mode or routine, I/O configurations, symbology enablement, output interface functionality, min/max symbology character lengths, scan engine selection, illumination functionality, settings that affect the functional operation of the processor(s), which codes are enabled for processing, aimer operation, engine orientation, illumination, photosensor functionality, software control, sales tracking or warranty tracking, reader capabilities, etc.

Readers and a host system may be equipped with the ability to automatically query and communicate data, such as configuration settings or firmware amongst each other. Upgrading firmware from host to reader and duplicating configuration settings may be performed without human intervention to ensure readers are operating at the same revision and have the same configuration settings reduces user frustration, down time, data integrity and increase efficiencies.

Readers may be configured by means of bar codes menus or via serial connection using serial commands. A GUI interface may be utilized for creating or reading serial commands, such as Visual Menu or similar such product. This may be done locally or remotely by connecting the reader either directly or through a network (such as the internet) to a remote computer and having the remote computer provide software upgrades.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Exemplary configuring methods may be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs", "objects", "functions." "subroutines", "libraries", ".dlls", "APIs", and "procedures", While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. These signals are referred to as "bits", "values", "elements", "symbols", "characters", "images", "terms", "numbers", or the like.

There exist a variety of platforms and languages for creating software. Exemplary embodiments may be implemented using programming like C, VBSCRIPT®, JAVA™, PYTHON™, etc. The choice of platform and language is often dictated by the specifics of the actual system constructed, such that what may work for one type of system may not be efficient on another system.

In an exemplary embodiment, barcodes may be utilized to encode, transport and execute software components. An executable file, code or program comprising scripting language, script language, extension language, opcodes, compiled object code which is capable of being directly executed on a real or virtual computer platform may be translated into a form for encoding as a barcode or information bearing indicia referred to herein as an "image code". The image code may be read and executed in an image code real or virtual machine.

An exemplary language for translating into an image code may be a PYTHON™ script or the bytecodes of JAVA™.

An opcode (operation code) is the portion of a machine language instruction that specifies the operation to be performed. Their specification and format are laid out in the instruction set architecture of a processor (which may be a general CPU or a more specialized processing unit). Apart from the opcode itself, an instruction normally also has one or more specifiers for operands (i.e. data) on which the operation should act, although some operations may have implicit operands, or none at all. There are instruction sets with nearly uniform fields for opcode and operand specifiers, as well as others with a more complicated, varied length structure.

Depending on architecture, the operands may be register values, values in the stack, other memory values, I/O ports, etc, specified and accessed using more or less complex addressing modes. The types of operations include arithmetics, data copying, logical operations, and program control, as well as special instructions (such as CPUID and others).

Opcodes can also be found in so called byte codes and other representations intended for a software interpreter rather than a hardware device. These software based instruction sets often employ slightly higher-level data types and operations than most hardware counterparts, but are nevertheless constructed along similar lines. Examples include the JAVA™ programming language's Java Virtual Machine (JVM™), the byte code used in GNU Emacs for compiled LISP code, .NET Common Intermediate Language, and others.

Assembly language is a low-level programming language, which uses mnemonics, instructions and operands to represent machine code. This enhances the readability while still giving precise control over the machine instructions. Most programming nowadays is done using high-level programming languages, which are typically easier to read and write. These languages need to be compiled (translated into machine language), or run through other compiled programs.

An executable file causes a computer, controller or processor to perform indicated tasks according to encoded instructions, as opposed to a data file that must be parsed by a program to be meaningful. These instructions are traditionally machine code instructions for a physical CPU. However, a file containing instructions (such as bytecode) for a software interpreter may also be considered executable.

A computer program (also a software program, or just a program) is a sequence of instructions written to perform a specified task for a computer. A computer requires programs to function, typically executing the program's instructions in a processor. The program has an executable form that the computer can use directly to execute the instructions.

Interpreted computer programs in a batch or interactive session are either decoded and then immediately executed or are decoded into some efficient intermediate representation for future execution. BASIC, PERL, and PYTHON™ are examples of immediately executed computer programs. Alternatively, JAVA™ computer programs are compiled ahead of time and stored as a machine independent code called bytecode. Bytecode is then executed upon request by an interpreter called a virtual machine.

The mapping between messages and barcodes is called a symbology. The specification of a symbology includes the encoding of the characters of the message as well as the start and stop markers into dark and white space, the size of quiet zones required to be before and after the barcode as well as the computation of checksums.

In an exemplary embodiment, application software is translated into the encoded image code. An exemplary software for translating into an image code may be portable software. Portable software is a class of software that is suitable for use on portable devices, such as a PDA or PDT. The portable software may not require any formal installation onto a portable device's permanent storage to be executed, and may be used on multiple devices. Settings are stored with, and may be carried around with, the software. The portable software may leave a zero (or near-zero) "footprint" on the device it's run on after being used (i.e. temporary files/registry settings are removed once the program has exited, and files created by the user may be saved directly to the same removable media as the application is stored on).

In an exemplary embodiment, the executable image codes may be printed on printed material, such as paper, newspapers, magazines, advertising billboards, books, packaging materials, etc.

In an exemplary embodiment, the executable image codes may be displayed on a display, such as a computer monitor, PDA display, PDT display, mobile phone display, television, etc.

Exemplary barcodes may be scanned by a handheld optical indicia reader and the content of the indicia, image code or barcode would then be installed as an application on the device.

In order to allow the encoding of larger amounts of data in a single barcode symbol, a number of 1D stacked barcode symbologies have been developed which partition encoded data into multiple rows, each including a respective 1D barcode pattern, all or most all of which must be scanned and decoded, then linked together to form a complete application. Scanning still requires relatively high resolution in one dimension only, but multiple linear scans are needed to read the whole symbol.

In certain situations, a single stacked 1D symbol or a single 2D symbol might not be operable to provide enough information for an executable application. The desired application may be encoded into multiple machine readable bar codes using a structured append feature. A structured append feature is information which ends the read data of a symbol which may allow each symbol to be tagged with a "Symbol M of N" indicator, so that a reader can see symbols in any order and reconstruct the original message. Each of those symbols may be realized as a bitmap which are then realized as a frame of an animated Graphics Interchange Format GIF image file which is displayed on a display or graphic user interface (GUI) to be read by an indicia reader. The animated GIF is may be considered a series or plurality of information bearing indicia displayed one after another (in a series or seriatim) on a display. The indicia reader reads and decodes the plurality of indicia. The duration to show each frame may be adjusted depending on the speed of the reader, and may be for example a 750 ms time frame. The GIF may be set to loop or repeat. In a typical reading operation the reader may be operated in continuous mode to capture each symbol and output the combined message after looping through the displayed images. If the reader misses one or more symbols it may read them on a subsequent loop. Other animation file formats, such as Microsoft Windows Animated Cursor (ANI), FLC, FLI, Multi-image Network Graphics (MNG), Flash (SWF), or other may be utilized.

This operation may be described as time modulation, where synchronization is handled by the structured append mechanism of the machine readable code, and the display is handled by the standard GIF format so that it is accessible to a wide variety of devices with miniature displays. Different types of indicia may be utilized, such as Aztec Code which has a finder pattern in the center of the symbol. If the display surface is shiny such as on a mobile phone for example, the finder pattern may be remote from shiny bezel areas. Aztec Code offers a structured append feature, which allows multiple symbols to be appended in a pre-determined order to communicate a greater number of data bytes. In this application multiple Aztec Code symbols may be combined in an animated .GIF or other animation type format file. As the animation plays out, the display is updated with a running loop of multiple Aztec Code symbols shown one after another in a continuous fashion. A reader views the display, and over time it captures all the symbols and outputs the larger data message. In this manner, a greater number of data bytes may be communicated while maintaining ease of reading. GIF files may be displayed on many different types of displays due to its standardized format.

The application is output is a "combination" of a plurality of decoded information bearing indicia. In other words, a plurality of "related" barcodes are read and decoded. The decoded information is combined by a controller into a comprehensive application. The controller recognizes the barcodes are related by specific information provide within each of the related barcodes.

Other exemplary symbology may be Data Matrix or QR Code. The X-dimension may be chosen to be an integer multiple of display "dots" or "pixels". For example, three by three pixels for each square module in the symbol may be utilized. Larger X-dimensions result in codes that are easier to use, but fewer data bytes may be encoded.

Figure 3:
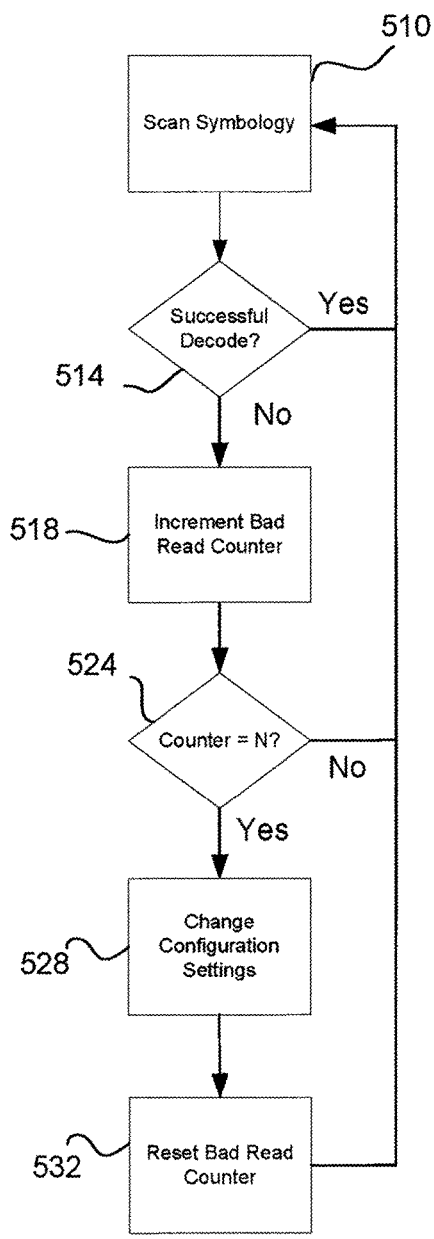
FIG. 3 is an exemplary flowchart for reading indicia and processing the data provided therein.

FIG. 3 is a flowchart of an exemplary method of operating an indicia reader, wherein a reader scans a symbology in a step 510. A query is made in a step 514 if there was a successful decode. If no, increment bad read counter in a step 518. A query is made in a step 524 if counter=N?. If yes, change configuration settings in a step 528 and reset bad read counter, resets the bad read counter in a step 532 and takes another scan in step 510.

In an exemplary indicia reading operation an indicia is read. The data is checked to determine if the data in the indicia indicates if it is related to other indicia. If no, the data from the indicia is processed. If yes, then another indicia is read. The data recovered is then checked to determine if the data in the indicia indicates if it is related to other indicia. If no, then the data from all the read indicia that are related is combined. If yes, then a determination is made if the data from the last indicia read indicates it is the last of related indicia. If yes, then the data from all the read indicia that are related is combined. If no, then another indicia is read. After data from all the read indicia that are related is combined, a determination is made if there is missing data from the already combined data. If yes, then another indicia is read. If no, then the data from indicia read is processed further by a controller or host device.

In an exemplary embodiment, a customer utilizes a controller such as a personal computer on the internet to access a web server or controller of a provider to remotely order an executable application from a provider. The provider sends or communicates a barcode to a display platform such as a mobile phone owned by the customer, the barcode being representative of the product ordered. The provider may also send authentication data to the customer for utilization as an authentication process when the barcode is displayed. The customer displays the barcode to an optical indicia reader which scans the barcode to load the application encoded in the barcode into the indicia reader.

Many relatively easy to read indicia may be utilized in the present exemplary invention to create a data packet or message which contains more information than what otherwise would be practical or possible in a singular indicia. The data packet or message may represent many things.

It should be understood that the methods described herein are not limited to being executed as software on a computer or DSP (Digital Signal Processor), but may also be implemented in a hardware processor. For example, the methods may be implemented with HDL (Hardware Design Language) in an ASIC.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. Also, unless applicants have expressly disavowed any subject matter within this application, no particular embodiment or subject matter is considered to be disavowed herein.

The invention claimed is:

1. A method of operating an indicia reader comprising:
reading a plurality of indicia, at least two of the indicia each comprising a respective encoded a portion of an executable software program;
establishing a relationship of data provided in the plurality of indicia utilizing at least a portion of the data provided in each of the plurality of information data bearing indicia;
using the established relationship to create an assembled software program from a combination of the respective encoded portions of the executable software program and,
running the assembled software program;
wherein the encoded executable software program comprises compiled object code capable of being directly executed on a real or virtual computer platform.

2. The method in accordance with claim 1, wherein the portion of the data comprises a structured append feature of a 2D code.

3. The method in accordance with claim 1, wherein the information data bearing indicia is an animated format symbol.

4. The method in accordance with claim 1, wherein the information data bearing indicia is an animation file provided in at least one of the following formats: GIF, ANI, FLC, FU, MNG, and SWF.

5. The method in accordance with claim 1, wherein the indicia is displayed by at least one of the following: a mobile phone; a portable data terminal (PDT) and a personal digital assistant (PDA).

6. The method in accordance with claim 1, wherein the portion of data comprises an indicia M of N indicator.

7. The method in accordance with claim 1, wherein the information data bearing indicia comprises an animated format symbol.

8. The method in accordance with claim 1, wherein the reading is performed in a continuous mode to capture each indicia and the indicia are combined after looping through all of the plurality of indicia.

9. An indicia reader system comprising:
an indicia reader for reading at least one indicia, the indicia comprising an encoded executable software program for updating the firmware of the indicia reader;
a display for displaying the at least one indicia;
wherein the at least one indicia comprises two or more indicia having a portion of the encoded executable software program displayed on the display seriatim;
a memory for storing encoded executable software program, wherein the at least one indicia comprises the encoded executable software program; and,
a processor for executing the encoded executable software program on the indicia reader thereby updating the firmware of the indicia reader;
wherein the processor:
recognizes a relationship of the portions of the encoded executable software program;
assembles the encoded executable software program from the portions of the encoded executable software program using the recognized relationship; and
wherein the encoded executable software program comprises compiled object code capable of being directly executed on a real or virtual computer platform.

10. The indicia reader system in accordance with claim 9, wherein the executable software program comprises at least one of the following: scripting language, script language, extension language, and opcodes.

11. The indicia reader system in accordance with claim 9, wherein the executable software program is printed or displayed on at least one of the following: paper, newspaper, magazine, advertising billboard, book, packaging, laptop display, television, computer monitor, and mobile device display.

12. The indicia reading system in accordance with claim 9, wherein the portions comprise a structured append feature of a 2D code.

13. The indicia reading system in accordance with claim 9, wherein the at least one indicia comprises animated format symbols.

14. The indicia reading system in accordance with claim 9 claim, wherein the display is provided on at least one of the following: a mobile phone, a portable data terminal (PDT), a television, and a personal digital assistant (PDA).

15. The indicia reading system in accordance with claim 9, wherein the portions comprise an indicia M of N indicator.

* * * * *